(12) United States Patent
Ishikawa

(10) Patent No.: US 8,972,486 B2
(45) Date of Patent: Mar. 3, 2015

(54) TERMINAL APPARATUS, PROCESSING SYSTEM, PROCESSING METHOD, AND PROGRAM

(75) Inventor: Tsuyoshi Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 517 days.

(21) Appl. No.: 13/069,516

(22) Filed: Mar. 23, 2011

(65) Prior Publication Data

US 2011/0238741 A1 Sep. 29, 2011

(30) Foreign Application Priority Data

Mar. 26, 2010 (JP) ................................. 2010-073174

(51) Int. Cl.
G06F 15/16 (2006.01)
G06F 3/00 (2006.01)
G06F 17/30 (2006.01)

(52) U.S. Cl.
CPC .................................. *G06F 17/3089* (2013.01)
USPC ............................. 709/203; 715/745; 715/760

(58) Field of Classification Search
USPC ............................. 709/203; 715/745; 707/802
See application file for complete search history.

(56) References Cited

U.S. PATENT DOCUMENTS

| | | | |
|---|---|---|---|
| 6,433,796 B1 * | 8/2002 | Taguchi | 715/753 |
| 6,570,583 B1 * | 5/2003 | Kung et al. | 345/661 |
| 6,643,641 B1 * | 11/2003 | Snyder | 707/709 |
| 7,015,932 B1 * | 3/2006 | Koike et al. | 345/619 |
| RE42,413 E * | 5/2011 | Snyder | 707/802 |
| 7,940,250 B2 * | 5/2011 | Forstall | 345/173 |
| 8,255,900 B2 * | 8/2012 | Nishibayashi et al. | 717/172 |
| 2005/0266494 A1 * | 12/2005 | Hodge | 435/6 |
| 2006/0227153 A1 * | 10/2006 | Anwar et al. | 345/660 |
| 2006/0233530 A1 * | 10/2006 | Kang et al. | 386/95 |
| 2006/0236235 A1 * | 10/2006 | Yamada | 715/527 |
| 2007/0157304 A1 * | 7/2007 | Logan et al. | 726/12 |
| 2008/0055273 A1 * | 3/2008 | Forstall | 345/173 |
| 2008/0103860 A1 * | 5/2008 | Hilerio et al. | 705/8 |
| 2008/0177994 A1 * | 7/2008 | Mayer | 713/2 |
| 2009/0204957 A1 * | 8/2009 | Nishibayashi et al. | 717/172 |
| 2009/0235158 A1 * | 9/2009 | Rosenstein et al. | 715/234 |
| 2009/0300554 A1 * | 12/2009 | Kallinen | 715/863 |
| 2010/0005069 A1 * | 1/2010 | Wang | 707/3 |
| 2010/0088612 A1 * | 4/2010 | Jia et al. | 715/745 |
| 2010/0095219 A1 * | 4/2010 | Stachowiak et al. | 715/745 |

FOREIGN PATENT DOCUMENTS

JP 2000-148640 5/2000

* cited by examiner

*Primary Examiner* — Brian P Whipple
*Assistant Examiner* — Michael A Chambers
(74) *Attorney, Agent, or Firm* — Sherr & Jiang, PLLC

(57) ABSTRACT

A terminal apparatus includes a communication unit, a storage unit, and a controller. The communication unit is capable of communicating with a web server and receives information of a web page from the web server. The controller displays the web page in a window displayed on a display unit, generates an image of the web page before a change each time the web page is changed to a different web page, associates the generated image with a change history of the web page to store the generated image in the storage unit, and reads the image corresponding to the change history from the storage unit based on an instruction made by a user to display the image, to display the image on the display unit.

18 Claims, 11 Drawing Sheets

Select

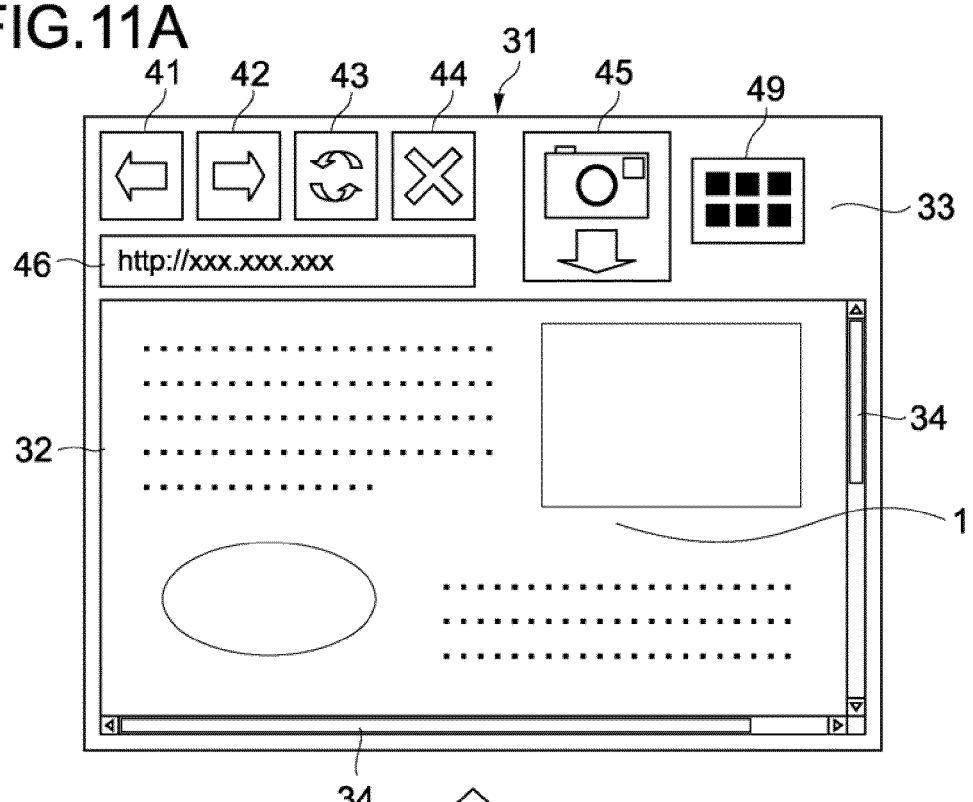
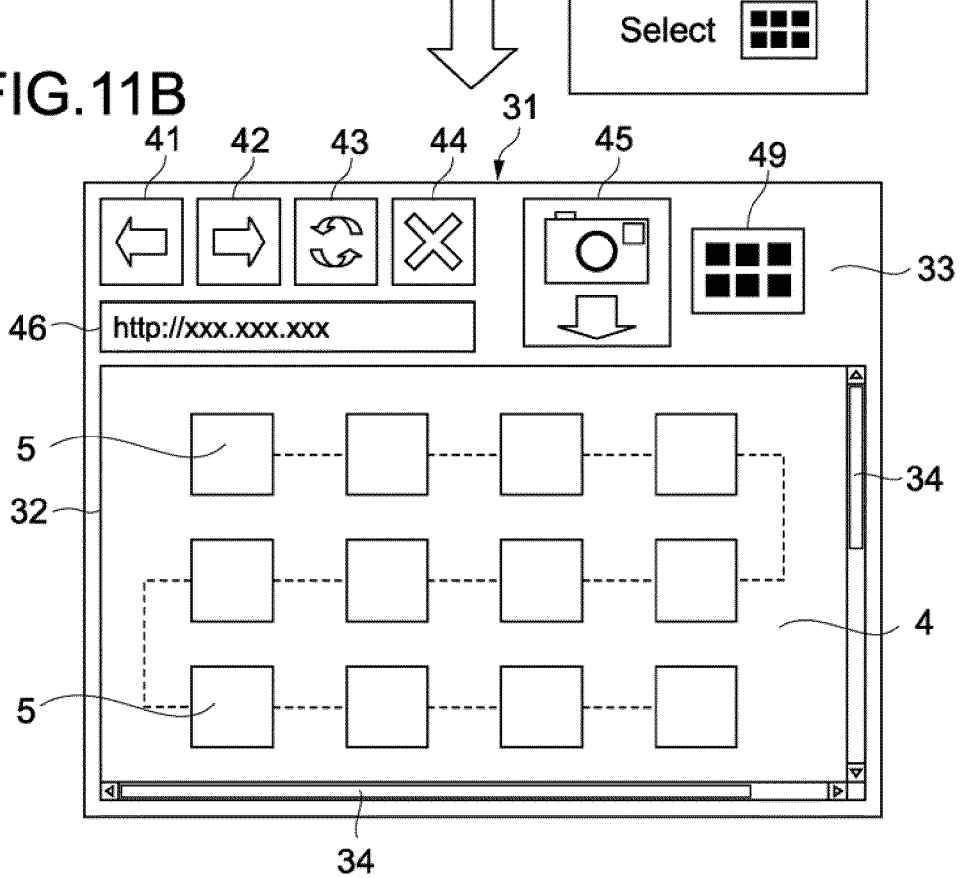

TERMINAL APPARATUS, PROCESSING SYSTEM, PROCESSING METHOD, AND PROGRAM

BACKGROUND OF THE INVENTION

1. Field of the Invention

The present invention relates to a terminal apparatus to display a web page on a display unit, a processing system including the terminal apparatus and a web server, a processing method, and a program.

2. Description of the Related Art

Terminal apparatuses such as PCs (Personal Computers) and cellular phones are each provided with a network function, and a user can browse web pages held by web servers on a network by using the network function of a terminal apparatus.

The processing related to browsing of a web page is executed based on a web browser of a terminal apparatus. When a URL (Uniform Resource Locator) is designated, the terminal apparatus (web browser) accesses a web server according to the HTTP protocol (HyperText Transfer Protocol), and requests acquisition of a web page corresponding to the URL. In response to the acquisition request, the web server transmits a web page in the form of HTML (HyperText Markup Language) or XHTML (eXtensible HyperText Markup Language) to the terminal apparatus. The terminal apparatus displays the received web page in a window displayed on a screen of a display unit.

In a case where the user browses web pages, the user may wish to redisplay a web page that the user has browsed once. In this case, the user operates a "back" button and a "forward" button displayed in the window on the screen, to thereby redisplay the web page that the user has browsed once in the window.

In recent years, as a method of redisplaying a web page, a method using a cache function is generally used (see, for example, Japanese Patent Application Laid-open No. 2000-148640, paragraphs [0044] to [0046], FIG. 6). In this method, a terminal apparatus (web browser) associates information acquired from a web server, such as HTML data, with a URL and stores the information in a cache, and uses the information stored in the cache when the web page is redisplayed. According to this method, the web page can be redisplayed without retransmission of the URL to the web server, with the result that a period of time up to when a web page is redisplayed can be shortened.

SUMMARY OF THE INVENTION

As described above, in the case where the user may wish to redisplay a web page that the user has browsed once, the user operates the "back" button, the "forward" button, and the like displayed in the window on the screen to thereby redisplay the web page. However, in reality, the web page intended to be displayed by the user is not displayed in the window on the screen in many cases.

For example, in a case where a user uses a shopping service or the like over the Internet, there occurs a case where the user misses important information that is displayed on a screen, such as a purchase list or a payment number of the shopping, without taking a note thereof, and then searches for the important information hurriedly after learning that the important information is necessary. In this case, the user operates the "back" button in the window to go back in a display history of the web page.

However, in a case where a designation to prohibit caching, such as "Cache-Control: no-cache", is included in HTML data of a web page that is transmitted from the web server, data is not cached in the browser and does not remain in the terminal apparatus. In a case where a web page for which caching is prohibited is redisplayed, a URL is transmitted to the web server again. In this case, error contents are often transmitted from the web server, and an error message is displayed in the window. As a result, the user is unable to browse the missed web page again and confirm the information displayed when the user has browsed the web page afterward.

In view of the circumstances as described above, it is desirable to provide the technique for a terminal apparatus and the like capable of browsing a missed web page again and confirming information displayed in the web page afterward.

According to an embodiment of the present invention, there is provided a terminal apparatus including a communication unit, a storage unit, and a controller.

The communication unit is capable of communicating with a web server and receives information of a web page from the web server.

The controller displays the web page in a window displayed on a display unit, generates an image of the web page before a change each time the web page is changed to a different web page, associates the generated image with a change history of the web page to store the generated image in the storage unit, and reads the image corresponding to the change history from the storage unit based on an instruction made by a user to display the image, to display the image on the display unit.

In the terminal apparatus, each time the user changes the web page, the image of the web page that is displayed on the display unit before the image is changed is automatically generated by the control of the controller, and is automatically stored in the storage unit. Therefore, even when information or the like that has to be confirmed afterward is displayed in the web page before the change, the web page is automatically stored in the storage unit, as an image.

Then, in the terminal apparatus, the image is associated with the change history of the web page and stored in the storage unit, and based on the instruction made by the user to display the image, the image corresponding to the change history is read from the storage unit and displayed on the display unit.

For example, it is assumed that an error message is displayed when the user operates a back button or a forward button in the window to change the web page. At this time, when the user gives an instruction to display an image, an image corresponding to a change history, for example, an image showing how a web page, which is the error message at the present, has been displayed in the past is displayed on the display unit. Accordingly, the user can browse the missed web page again and confirm information having been displayed in the web page afterward.

In the terminal apparatus, the controller may display an input operation image in which the instruction made by the user to display the image is input, on the display unit.

In this case, the controller may display the input operation image on a confirmation screen used for confirming, with the user, whether information for redisplaying the web page displayed in the past is transmitted to the web server via the communication unit.

In a case where information for redisplaying the web page displayed in the past (for example, form information) has to be retransmitted to the web server, the processing unintended by the user may be executed in many cases. For example, it is assumed that when the user uses a shopping service or the like over the Internet, the user inputs the number of products to be purchased by the user in an input column of a web page, as form information. Then, in the case where the number of products to be purchased by the user is retransmitted as the form information to the web server when the web page is referred back to, there may be a case where the products are purchased twice at worst.

In this way, when the information for redisplaying is retransmitted to the web server, the processing unintended by the user may be executed in many cases. In this regard, according to the embodiment of the present invention, the input operation image is displayed on the confirmation screen used for confirming, with the user, whether information for displaying a web page is transmitted again to the web server.

Accordingly, it is possible to prevent the processing unintended by the user from being executed, for example.

In the terminal apparatus, in a case where the input operation image is displayed on the display unit, the controller may display the input operation image in an operation image display area of the window in which operation images for operating the web page are arranged.

In the terminal apparatus, the input operation image is displayed in the operation image display area of the window, with the result that the operability can be improved.

In the terminal apparatus, the controller may perform, when the web page is changed to the different web page, scroll capture on the web page before the change, to generate the image of the entire web page before the change.

Accordingly, in a case where the web page does not fit into the window, the image of the web page as a whole can be stored in the storage unit, with the result that the user can browse the entire web page when browsing the web page afterward through the image.

In the terminal apparatus, the controller may display the image, instead of the web page, in a main display area serving as an area of the window in which the web page is displayed. Alternatively, the controller may display a dedicated window on the display unit separately from the window and display the image in the dedicated window.

In the terminal apparatus, the controller may display the image after being changed in an order corresponding to the change history based on an instruction made by the user to change the image.

In the terminal apparatus, the controller may generate a history image showing a state where reduced-size images of the images are arranged in an order corresponding to the change history based on the images that are associated with the change history and stored in the storage unit, and display the history image on the display unit based on an instruction made by the user to display the history image.

In the terminal apparatus, the history image showing the state where the reduced-size images of the images are arranged in the order corresponding to the change history of the web pages is displayed on the display unit, with the result that user can search out a missed web page speedily.

According to another embodiment of the present invention, there is provided a terminal apparatus including a communication unit, a storage unit, and a controller.

The communication unit is capable of communicating with a web server and receives one of information on a first web page including metadata indicating that an image of a web page displayed on a display unit is to be stored, and information on a second web page excluding the metadata, from the web server.

The controller displays one of the first web page and the second web page in a window displayed on the display unit based on one of the information on the first web page and the information on the second web page, generates an image of the first web page based on the metadata each time the first web page is displayed, associates the image with a change history of the first web page and the second web page to store the image in the storage unit, and reads the image corresponding to the change history from the storage unit based on an instruction made by a user to display the image, to display the image on the display unit.

In the terminal apparatus, out of the information on the first web page and the information on the second web page, which are transmitted from the web server, the information on the first web page includes the metadata indicating that an image of a web page is to be stored. Based on the metadata, the controller of the terminal apparatus generates an image of the first web page each time the first web page is displayed, and associates the image with a change history of the first web page and the second web page to store the image in the storage unit. Then, in a case where an instruction to display the image is made by the user, the controller reads the image from the storage unit to display the image on the display unit.

By such processing as well, the user can browse a missed web page again, and confirm information displayed in the web page afterward.

According to another embodiment of the present invention, there is provided a processing system including a web server and a terminal apparatus.

The web server transmits information of a web page.

The terminal apparatus includes a communication unit, a storage unit, and a controller.

The communication unit is capable of communicating with the web server and receives information of the web page from the web server The controller displays the web page in a window displayed on a display unit, generates an image of the web page before a change each time the web page is changed to a different web page, associates the generated image with a change history of the web page to store the generated image in the storage unit, and reads the image corresponding to the change history from the storage unit based on an instruction made by a user, to display the image on the display unit.

According to another embodiment of the present invention, there is provided a processing system including a web server and a terminal apparatus.

The web server transmits one of information on a first web page including metadata indicating that an image of a web page displayed on a display unit is to be stored, and information on a second web page excluding the metadata.

The terminal apparatus includes a communication unit, a storage unit, and a controller.

The communication unit is capable of communicating with the web server and receives one of the information on the first web page and the information on the second web page from the web server.

The controller displays one of the first web page and the second web page in a window displayed on the display unit based on one of the information on the first web page and the information on the second web page, generates an image of the first web page based on the metadata each time the first web page is displayed, associates the image with a change history of the first web page and the second web page to store the image in the storage unit, and reads the image corresponding to the change history from the storage unit based on an instruction made by a user to display the image, to display the image on the display unit.

According to another embodiment of the present invention, there is provided a processing system including a web server, a server, and a terminal apparatus.

The web server transmits information of a web page.

The server includes a storage unit.

The terminal apparatus includes a communication unit and a controller.

The communication unit is capable of communicating with the web server and the server and receives information of the web page from the web server.

The controller displays the web page in a window displayed on a display unit, generates an image of the web page before a change each time the web page is changed to a different web page, associates the generated image with a change history of the web page to transmit the generated image to the server, causes the storage unit of the server to store the generated image, and receives the image corresponding to the change history from the server based on an instruction made by a user, to display the image on the display unit.

In the processing systems, the image of the web page is associated with the change history of the web page and transmitted from the terminal apparatus to the server to be stored in the storage unit of the server. Accordingly, the image is not stored in the storage unit of the terminal apparatus, with the result that this system can be effectively used even in terminal apparatuses (for example, cellular phones) having a relatively small capacity of a storage unit, for example.

According to another embodiment of the present invention, there is provided a processing method including receiving information of a web page from a web server.

In a window displayed on a display unit, the web page is displayed.

Each time the web page is changed to a different web page, an image of the web page before a change is generated.

The generated image is associated with a change history of the web page to be stored in a storage unit.

The image corresponding to the change history is read from the storage unit based on an instruction made by a user to display the image, to be displayed on the display unit.

According to another embodiment of the present invention, there is provided a processing method including receiving one of information on a first web page including metadata indicating that an image of a web page displayed on a display unit is to be stored, and information on a second web page excluding the metadata, from a web server.

Based on one of the information on the first web page and the information on the second web page, one of the first web page and the second web page is displayed in a window displayed on the display unit.

Each time the first web page is displayed, an image of the first web page is generated based on the metadata.

The image is associated with a change history of the first web page and the second web page to be stored in a storage unit.

Based on an instruction made by a user to display the image, the image corresponding to the change history is read from the storage unit to be displayed on the display unit.

As described above, according to the embodiments of the present invention, it is possible to provide the technology for a terminal apparatus and the like capable of browsing a missed web page again and confirming information displayed in the web page afterward.

These and other objects, features and advantages of the present invention will become more apparent in light of the following detailed description of best mode embodiments thereof, as illustrated in the accompanying drawings.

BRIEF DESCRIPTION OF DRAWINGS

FIG. 11 are diagrams showing an example in which a state where a web page is displayed on the display unit and a state where a history image is displayed thereon are switched.

DESCRIPTION OF PREFERRED EMBODIMENTS

Hereinafter, embodiments of the present invention will be described with reference to the drawings.

First Embodiment

[Overall Structure of Processing System and Structures of Respective Units]

Figure 1:
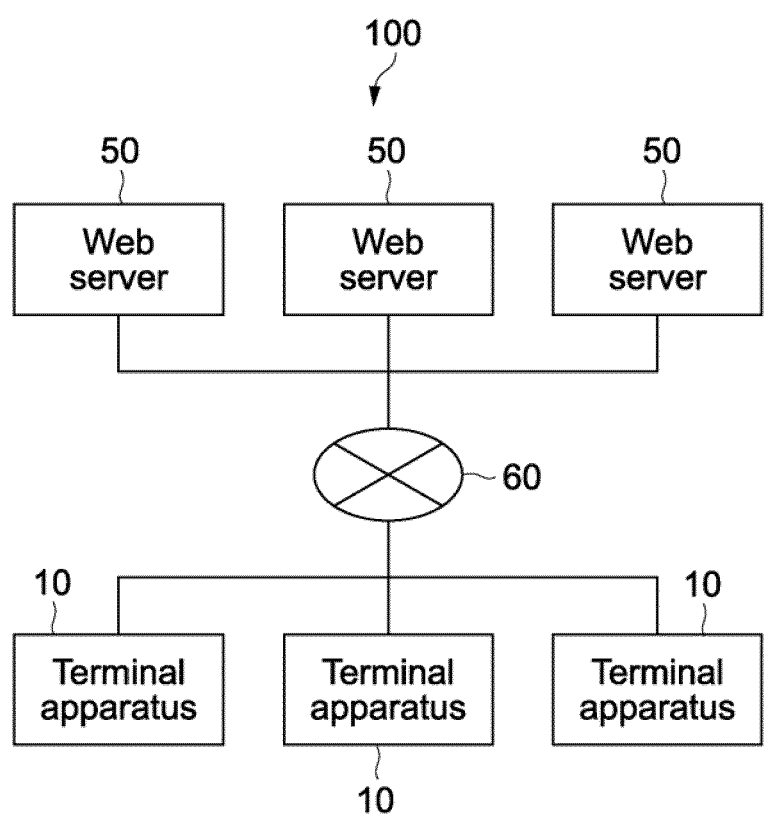
FIG. 1 is a diagram showing a processing system according to an embodiment of the present invention.

FIG. 1 is a diagram showing a processing system according to a first embodiment of the present invention.

As shown in FIG. 1, a processing system 100 includes a plurality of web servers 50 and a plurality of terminal apparatuses 10. The plurality of web servers 50 and the plurality of terminal apparatuses 10 are connected to each other via a network 60 such as the Internet.

In the following description, a PC (Personal Computer) 10 is exemplified as the terminal apparatus 10.

Figure 2:
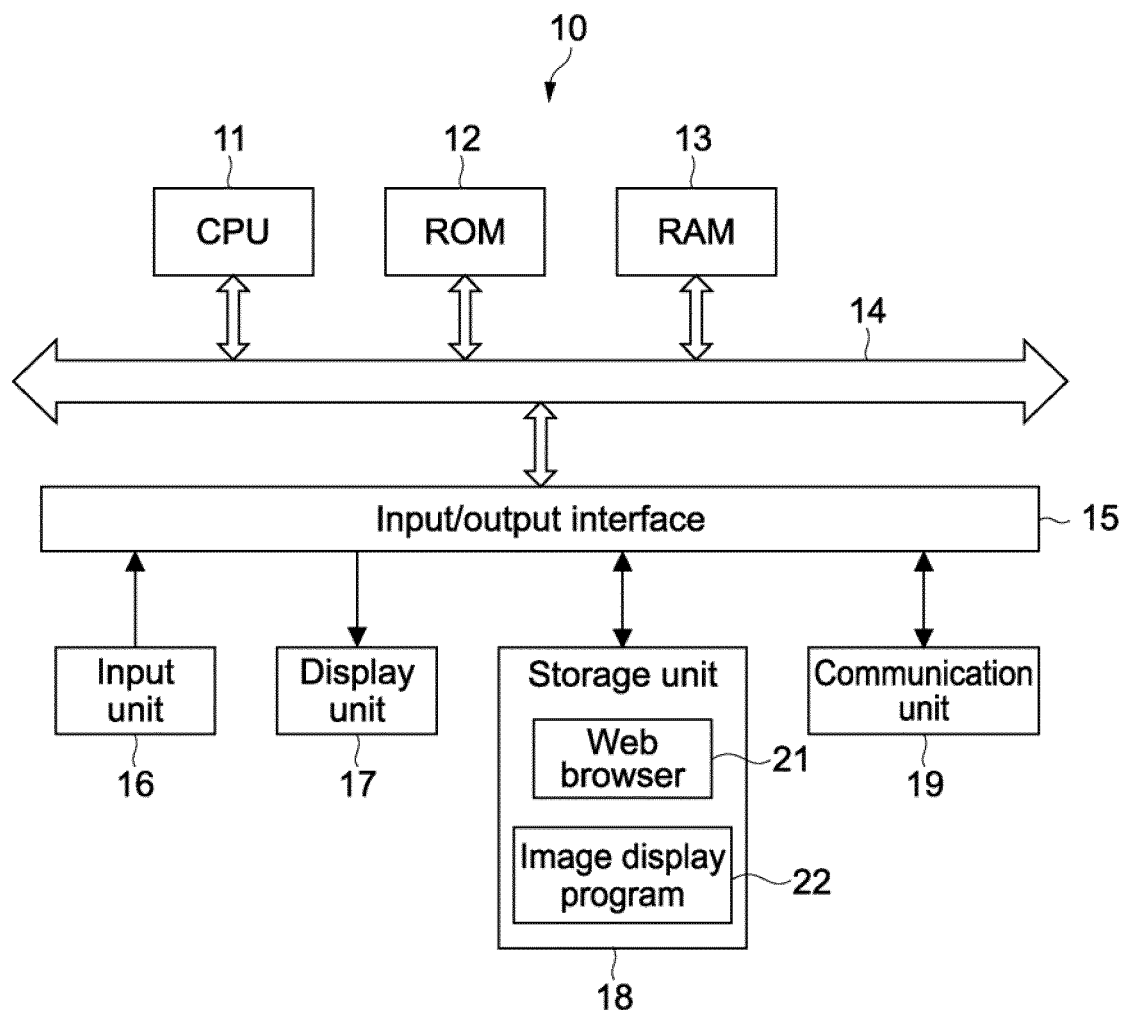
FIG. 2 is a block diagram showing the internal structure of a PC (terminal apparatus)

FIG. 2 is a block diagram showing the internal structure of the PC 10 (terminal apparatus 10).

As shown in FIG. 2, the PC 10 includes a CPU (Central Processing Unit) 11 (controller), a ROM (Read Only Memory) 12, and a RAM (Random Access Memory) 13, which are connected to one another by a bus 14.

The PC 10 also includes an input unit 16, a display unit 17, a storage unit 18, and a communication unit 19, which are connected to one another by an input/output interface 15.

The CPU 11 accesses the RAM 13 as necessary, and collectively controls the respective units of the PC 10 while performing various kinds of computing processing. The RAM 13 is used as a work area or the like of the CPU 11, and temporarily stores an OS (Operating System), various programs being executed, various kinds of data being processed, drawing data, and the like.

The ROM 12 is a nonvolatile memory in which a BIOS (Basic Input/Output System), a boot program, and the like are stored. The CPU 11 loads the OS stored in the storage unit 18 into the RAM 13 according to the BIOS and the boot program stored in the ROM 12, at a time when the power supply of the PC 10 is turned on. As a result, the PC 10 functions as an information processing apparatus.

The input unit 16 includes a pointing device such as a mouse, a touchpad, and a trackpoint, a keyboard, and the like. The input unit 16 receives various operations made by a user, and outputs input operation signals to the CPU 11.

The display unit 17 is constituted of, for example, a TFT (Thin Film Transistor) liquid crystal display, an OEL (Organic Electro-Luminescence) display, or the like. The display unit 17 displays an image on a screen based on drawing data input via the input/output interface 15.

The storage unit 18 is constituted of, for example, a nonvolatile memory such as an HDD (Hard Disk Drive) and an SSD (Solid State Drive). The storage unit 18 stores the OS, and also stores a web browser 21 and various application programs such as an image display program 22.

Examples of the web browser 21 include Internet Explorer (registered trademark), Firefox (registered trademark), Google Chrome (registered trademark), Safari (registered trademark), and Opera (registered trademark), but any web browser may be used as the web browser 21.

The image display program 22 is a program that operates concomitantly with the web browser 21. The CPU 11 generates, according to the image display program 22, an image 2 (see FIG. 7B) of a web page 1 displayed on the screen of the display unit 17 (see FIG. 3), or displays the image 2 on the display unit 17. The processing executed by the CPU 11 based on the image display program 22 will be described later in detail.

It should be noted that the storage unit 18 stores HTML data or XHTML data of the web page 1 displayed on the display unit 17, or the image 2 of the web page 1. In other words, the storage unit 18 has a function as a cache area for the web browser 21 temporarily storing information such as HTML data of the web page 1, or a function as a storage area for the image display program 22 temporarily storing the image 2.

The communication unit 19 includes a network interface, a modem, and the like. The communication unit 19 connects to the network 60 to communicate with a web server 50 according to the HTTP protocol. The PC 10 transmits a transmission request of the web page 1 to the web server 50 via the communication unit 19, and receives text data of the web page 1, such as HTML data and XHTML data, which is transmitted from the web server 50.

Figure 3:
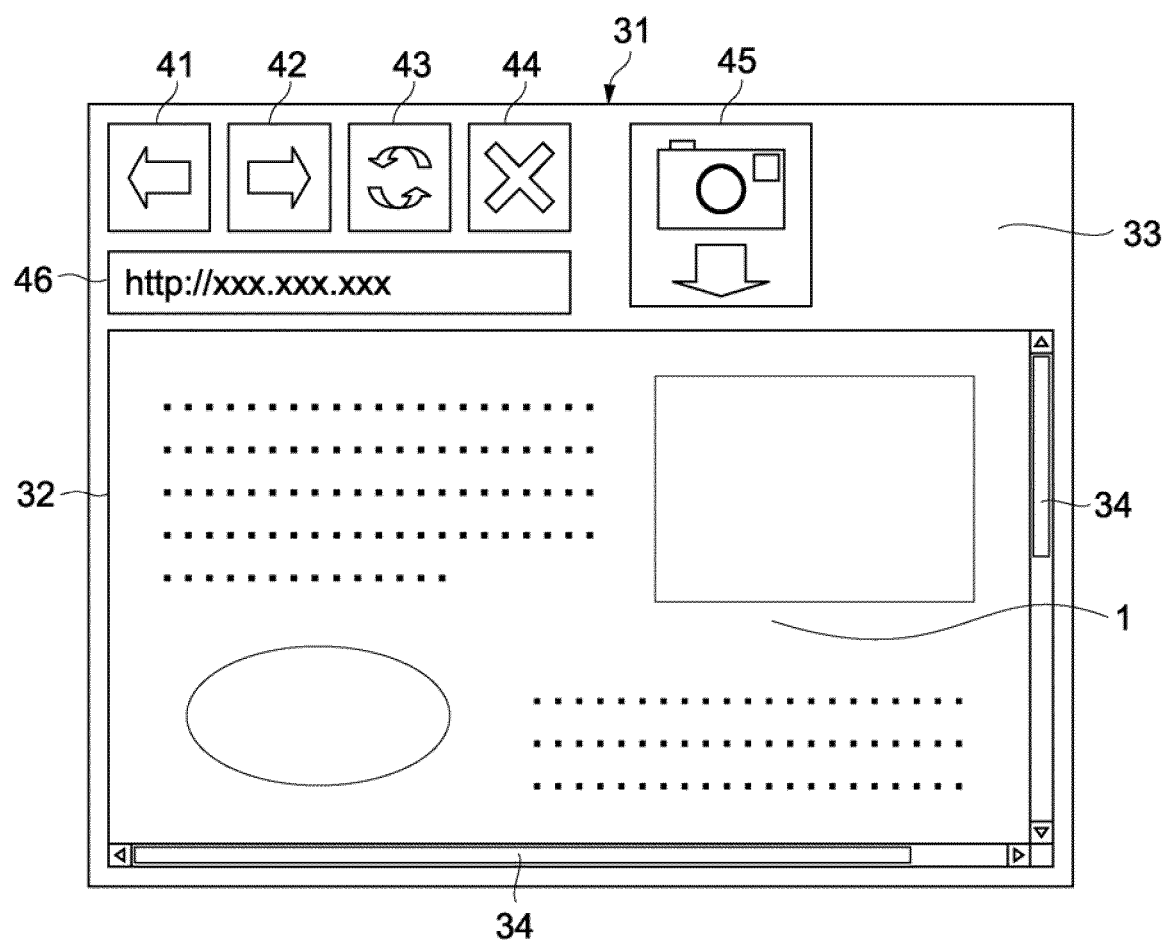
FIG. 3 is a diagram showing an example of a window displayed on a screen of a display unit.

FIG. 3 is a diagram showing an example of a window displayed on the screen of the display unit 17.

As shown in FIG. 3, a window 31 is displayed on the screen of the display unit 17, and a web page 1 is displayed in a main display area 32 of the window 31. On the right side and bottom side of the web page 1, scrollbars 34 for scrolling the web page 1 are displayed.

Further, a URL input column 46 is displayed on an operation panel 33 (operation image display area) displayed in an upper portion of the window 31. Further, on the operation panel 33, a plurality of operation images for operating the web page 1, such as a back button 41, a forward button 42, an update button 43, and a stop button 44, are displayed.

Furthermore, an image display button 45 (input operation image) for displaying an image 2 of the web page 1 in the main display area 32 is displayed on the operation panel 33. The image display button 45 has a figure of a camera so that the user can easily recall that the image 2 is to be displayed.

It should be noted that the display processing of the window 31 and the web page 1, and that of the URL input column 46, the back button 41, the forward button 42, the update button 43, the stop button 44, and the like on the operation panel 33 are executed based on the web browser 21. On the other hand, the display processing of the image display button 45 is executed based on the image display program 22.

[Description on Operation]

Next, the operation of the PC 10 (terminal apparatus 10) according to this embodiment will be described.

It should be noted that in the following description, a subject of operations is assumed to be the web browser 21 or the image display program 22, but all operations to be described later will be executed under the control of the CPU 11.

First, when the web browser 21 is activated, the web browser 21 displays the window 31 on the screen, and the web page 1 in the main display area 32 of the window 31. The web page 1 that is displayed on the window 31 when the web browser 21 is activated is, for example, a web page 1 that is initially set, or a web page 1 displayed when the web browser 21 has been ended last time. However, any web page 1 may be possible.

The display processing of the web page 1 is executed by the web browser 21 as follows.

For example, description is given assuming a case where the web page 1 is initially set. The web browser 21 reads a URL of a web page 1 initially set from the storage unit 18 at a time of activation. Then, the web browser 21 requests, according to the HTTP protocol, via the communication unit 19, the web server 50 holding a web page 1 corresponding to the URL to transmit the web page 1 corresponding to the URL.

The web server 50 receives a transmission request from the web browser 21, and transmits text data of the corresponding web page 1, such as HTML data and XTML data, to the web browser 21. The web browser 21 receives the text data via the communication unit 19, and reads the text data to display the text data in the main display area 32 of the window 31.

It should be noted that the processing related to the display of the web page 1 by the web browser 21 is typically the same as the operation performed when, for example, the user inputs a URL in the URL input column 46, or other operations. Therefore, hereinafter, the display processing performed by the web browser 21 will not be described. It should be noted that in a case where the text data such as HTML data of the web page 1 that has already been displayed is stored in the cache area of the storage unit 18, the web browser 21 may read the data from the storage unit 18 to display the data on the display unit 17.

(Generation and Storage of Image 2)

Figure 4:
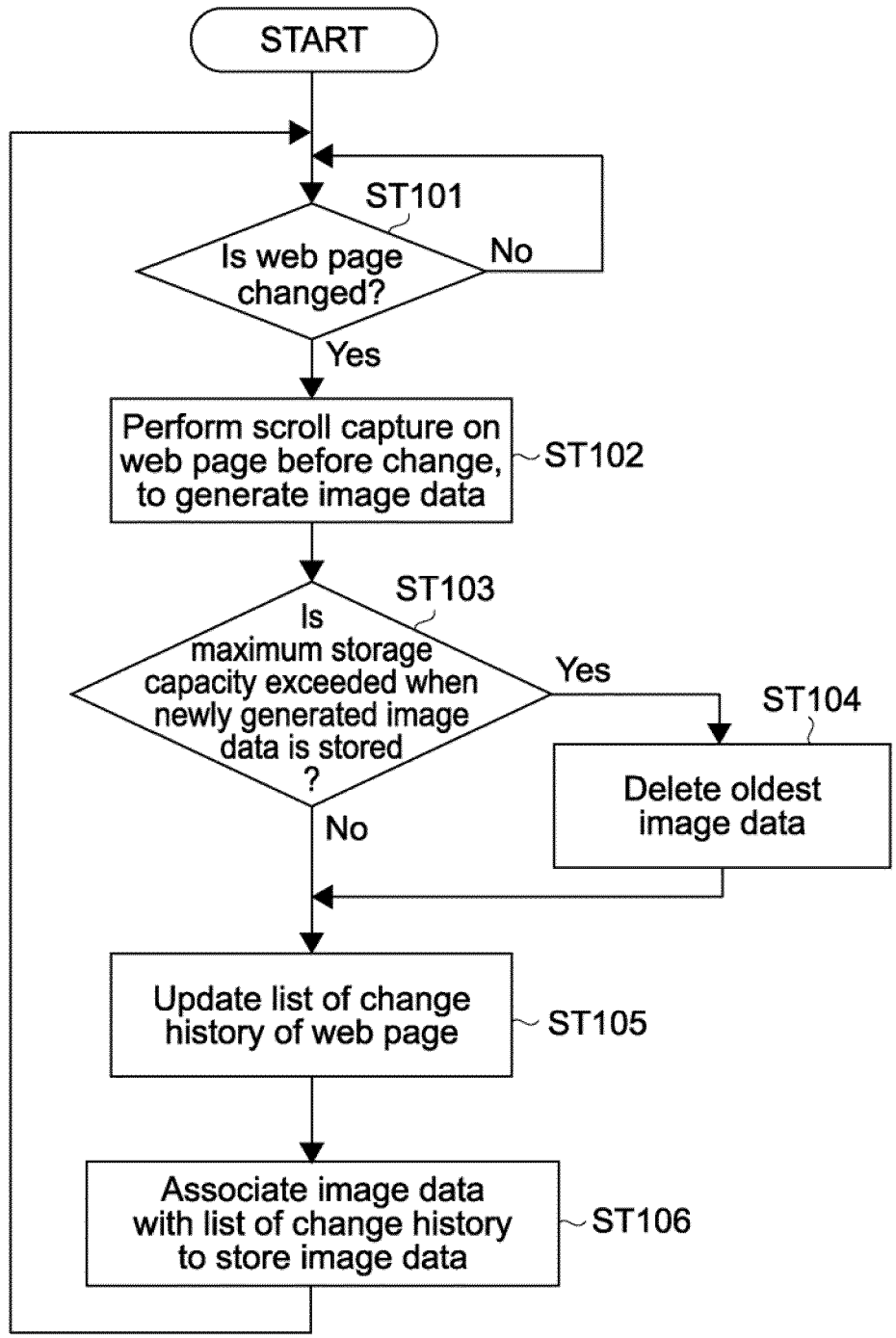
FIG. 4 is a flowchart showing an operation made when an image display program generates an image of a web page, and stores the image in the storage unit.

FIG. 4 is a flowchart showing an operation made when the image display program 22 generates an image 2 of the web page 1 and stores the image 2 in the storage unit 18.

Figure 5:
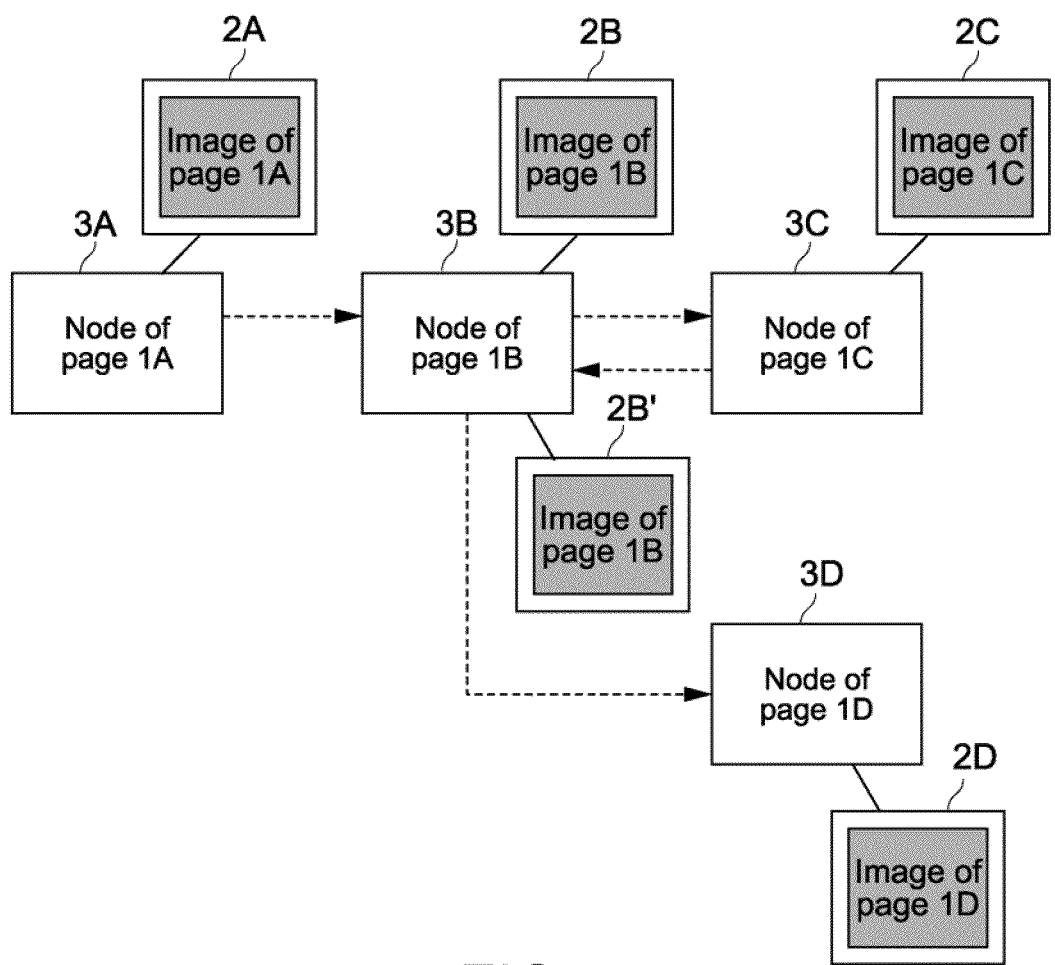
FIG. 5 is a schematic diagram showing a correspondence relationship between a list of change history of web pages and images of the web pages stored in association with the list of change history.

FIG. 5 is a schematic diagram showing a correspondence relationship between a list of change history of web pages 1 and images 2 of the web pages 1 stored in association with the list of change history.

When the web page 1 is displayed by the web browser 21, the image display program 22 judges whether the web page 1 being displayed is changed to a different web page 1 (Step 101).

Here, the case where the web page 1 is changed to another web page 1 includes, for example, a case where a user selects a link of a URL of a different web page 1 and thus the web page 1 is changed to the different web page 1. A case where a user inputs a URL in the URL input column 46, and thus the web page 1 being displayed is changed to a different web page 1 is also included.

Further, a case where a web page 1 registered in "Favorite", "Bookmark", or the like is designated, and thus the web page 1 being displayed is changed to a different web page 1 is included. Furthermore, a case where a user operates the back button 41 and the forward button 42, which are displayed on the operation panel 33, and thus the web page 1 is changed to a different web page 1 is included. In addition, the following case is also included. When a search word input column (not shown) is displayed on the operation panel 33 or in the web page 1, a search word is input in the search word input column and thus the web page 1 being displayed is changed to a different web page 1.

In a case where the web page 1 is changed to a different web page 1 (YES of Step 101), the image display program 22 performs scroll capture on the web page 1 before the change, to generate an image 2 of the entire web page 1 (Step 102). In this case, the image display program 22 performs scroll capture on the web page 1 from the start position of the vertical axis to the end position of the vertical axis, and also from the start position of the horizontal axis to the end position of the horizontal axis, so as to generate an image 2 of the entire web page 1.

As the image 2 of the web page 1, for example, bit map data, JPEG (Joint Photographic Experts group) data, and the like are included, but the image 2 is not limited thereto.

Next, the image display program 22 judges, in a case where the newly generated image 2 is stored in the storage unit 18, whether a maximum storage capacity of the storage unit 18, which is set in advance, is exceeded (Step 103).

When the maximum storage capacity is exceeded (YES of Step 103), the image display program 22 deletes the oldest image 2 (Step 104), and proceeds to the next step 105. On the other hand, when the maximum storage capacity is not exceeded (NO of Step 103), the image display program 22 does not delete the image 2 and proceeds to the next step 105.

In Step 105, the image display program 22 updates a list of change history of the web pages 1. Here, the list of change history refers to a list generated based on the change history of the web pages 1, and is a list as shown in FIG. 5, for example. This list of change history is stored in the storage unit 18.

Next, the image display program 22 associates the generated image 2 with the list of change history to store the generated image in the storage unit 18 (Step 106). In this case, the image display program 22 associates the generated image 2 with not the URL but each node 3A, 3B, 3C, or 3D of the change history to store the image 2 in the storage unit 18.

When associating the image 2 with the list of change history of the web pages 1 and storing the image 2, the image display program 22 returns to Step 101 again and judges whether the web page 1 is changed.

Here, with reference to FIG. 5, the processing of generating the image 2 or the like by the image display program 22 will be described in detail with an example.

First, it is assumed that a web page 1A is displayed by the web browser 21 in the main display area 32 of the window 31. In a case where a user selects a link in which a URL of a web page 1B is set, or a user inputs a URL of the web page 1B in the URL input column 46 in a state where the web page 1A is displayed, the web browser 21 displays the web page 1B in the main display area 32.

In a case where the web page 1A is changed to the web page 1B (YES of Step 101), the image display program 22 generates an image 2A of the entire web page 1A that is a web page before the change (Step 102). When assuming that the image 2 of the web page 1A is stored in the storage unit 18, the image display program 22 judges whether the maximum storage capacity is exceeded (Step 103). In a case where the maximum storage capacity is exceeded (YES of Step 103), the oldest image 2 is deleted (Step 104).

Next, the image display program 22 updates a list of change history of the web pages 1 (Step 105). In this case, the image display program 22 generates a node 3A of the web page 1A and a node 3B of the web page 1B, and stores the fact that the web page 1A proceeds by one page to thereby be changed to the web page 1B, in the storage unit 18, with the result that the image display program 22 updates the list of change history of the web pages 1.

Next, the image display program 22 associates the image 2A of the web page 1A with the node 3A of the web page 1A and stores the image 2A in the storage unit 18 (Step 106).

After that, in a case where the user selects a link or the like and the web page 1B is changed to a web page 1C accordingly, the image display program 22 generates an image 2B of the entire web page 1B that is a web page before the change.

Then, after judging the maximum storage capacity of the storage unit 18, the image display program 22 generates a node 3C of the web page 1C, and stores the fact that the web page 1B proceeds by one page to thereby be changed to the web page 1C, in the storage unit 18, with the result that the image display program 22 updates the list of change history. Then, the image display program 22 associates the image 2B of the web page 1B with the node 3B of the web page 1B and stores the image 2B in the storage unit 18.

After that, for example, in a case where the user operates the back button 41 on the operation panel 33 and the web page 1C is changed to the web page 1B, the image display program 22 generates an image 2C of the entire web page 1C that is a web page before the change.

Then, after judging the maximum storage capacity of the storage unit 18, the image display program 22 stores the fact that the web page 1C is returned back by one page to thereby be changed to the web page 1B, in the storage unit 18, with the result that the image display program 22 updates the list of change history. Then, the image display program 22 associates the image 2C of the web page 1C with the node 3C of the web page 1C and stores the image 2C in the storage unit 18.

After that, in a case where the user selects a link or the like and the web page 1B is changed to a web page 1D, the image display program 22 generates an image 2B' of the entire web page 1B that is a web page before the change. It should be noted that the image 2B of the web page 1B, which has been generated previously when the web page 1B is changed to the web page 1C, and the image 2B' of the web page 1B, which is generated this time when the web page 1B is changed to the web page 1D, may be the same or different. This depends on the display state obtained when the web page 1B is changed.

Next, after judging the maximum storage capacity of the storage unit 18, the image display program 22 generates a node 3D of the web page 1D and stores the fact that the web page 1B proceeds by one page to thereby be changed to the web page 1D, in the storage unit 18, with the result that the image display program 22 updates the list of change history. Then, the image display program 22 associates the image 2B' of the web page 1B with the node 3B of the web page 1B and stores the image 2B' in the storage unit 18.

It should be noted that the user selects a link or the like and the web page 1D is changed to a different web page 1, an image 2 of the entire web page 1D is generated.

By the processing as described above, each time the web page 1 is changed to a different web page 1, the list of change history is updated, and the list of change history and the image 2 of the web page 1 are associated with each other, and stored in the storage unit 18.

In other words, the image 2 of the web page 1 is automatically generated while being unintended by the user, and the image 2 is associated with the list of change history and automatically stored in the storage unit 18. Accordingly, even when information or the like that has to be checked later is displayed in the web page 1 before the change, the image 2 is automatically stored as the image 2 in the storage unit 18.

Further, in this embodiment, in a case where the total data size of the image 2 exceeds the maximum storage capacity of the storage unit 18, older images 2 are sequentially deleted, with the result that the storage unit 18 is prevented from being compressed more than necessary.

(Display of Image 2)

Next, an operation made when the image display program 22 displays the image 2 of the web page 1 based on the image 2 of the web page 1 that is stored in the storage unit 18 will be described.

Figure 6:
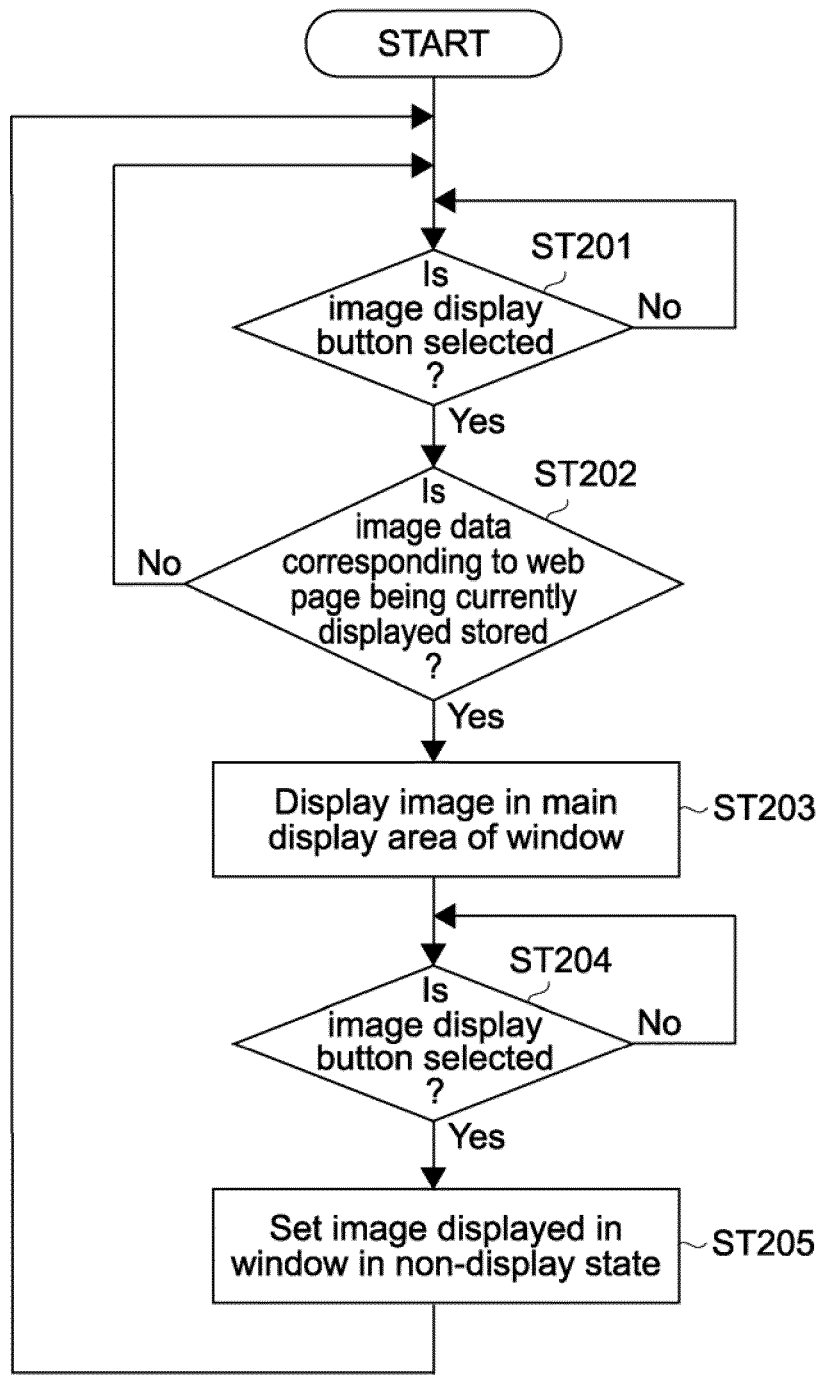
FIG. 6 is a flowchart showing an operation made when the image display program displays an image of a web page.

FIG. 6 is a flowchart showing an operation made when the image display program 22 displays the image 2 of the web page 1.

FIG. 7 are diagrams showing an example in a case where a state in which the web page 1 is displayed on the display unit 17 and a state in which an image 2 of the web page 1 is displayed thereon are switched.

The image display program 22 judges whether the image display button 45 displayed on the operation panel 33 of the window 31 is selected by the user (Step 201).

For example, in a case where the user operates a pointing device such as a mouse to put a pointer on the image display button 45 and click the left button of the mouse, the image display button 45 is selected (YES of Step 201).

When the image display button 45 is selected, the image display program 22 judges whether an image 2 corresponding to the web page 1 being currently displayed is stored in the storage unit 18 (Step 202).

As described above, an image 2 is stored while being associated with the list of change history of the web pages 1. Therefore, the image display program 22 only has to judge whether an image 2 corresponding to the web page 1 being currently displayed is stored in the storage unit 18 based on the list of change history of the web pages 1.

In a case where an image 2 corresponding to the web page 1 being currently displayed is not stored (NO of Step 202), the image display program 22 returns to Step 201.

Figure 7A:
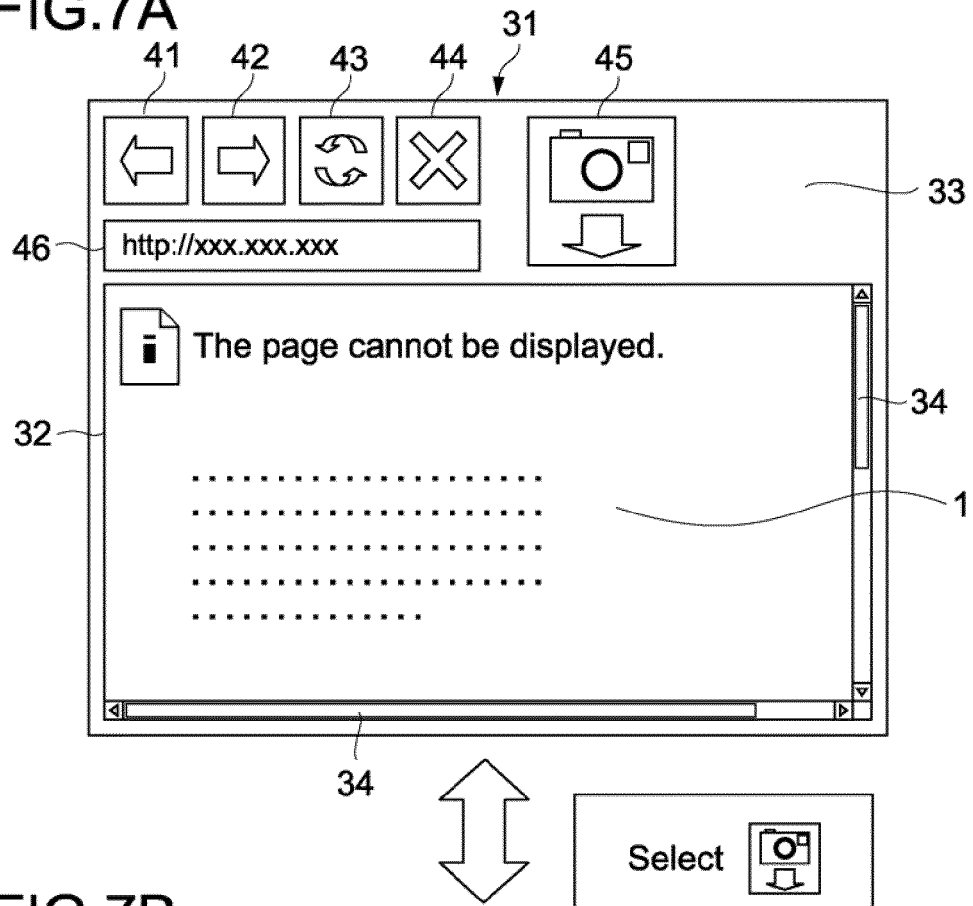
FIG. 7 are diagrams showing an example in a case where a state in which the web page is displayed on the display unit and a state in which an image of the web page is displayed thereon are switched.
Figure 7B:
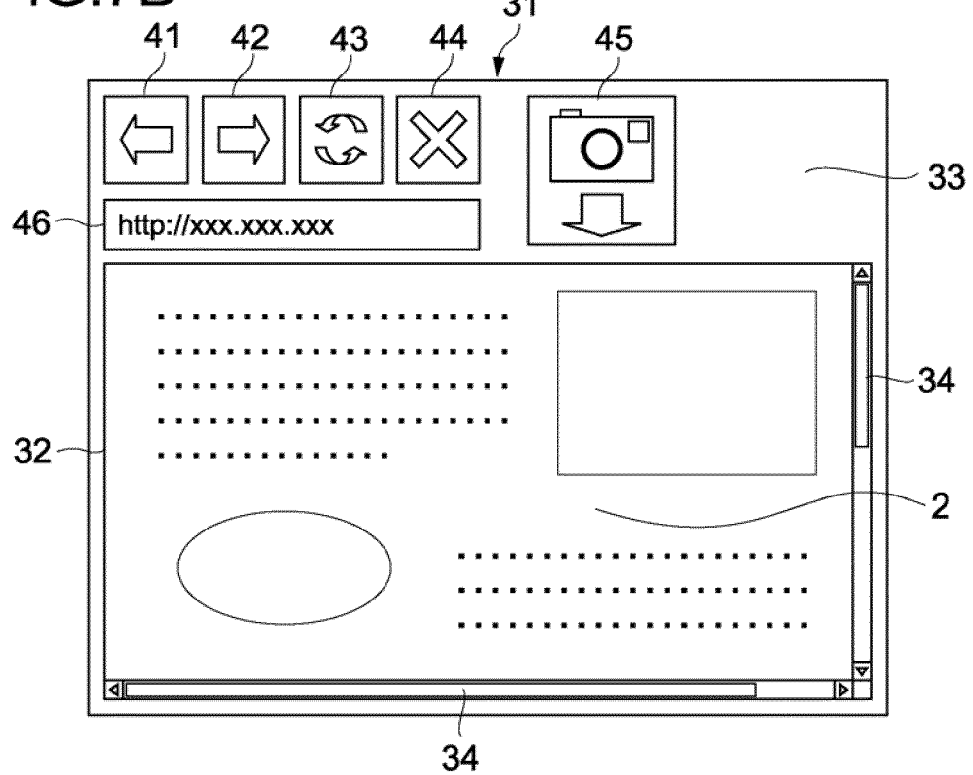

On the other hand, in a case where an image 2 corresponding to the web page 1 being currently displayed is stored (YES of Step 202), the image 2 is read from the storage unit 18 and displayed in the main display area 32 of the window 31 (Step 203) (see FIG. 7B).

It should be noted that as described above, the image 2 is generated by scroll capture performed on the web page 1, and therefore the size of the image 2 corresponds to the size of the entire web page 1. Accordingly, in a case where the size of the image 2 exceeds the size of the main display area 32 of the window 31, the image display program 22 displays part of the image 2 in the main display area 32, and in a case where the user operates the scrollbars 34, the image display program 22 scrolls the image 2 to display the image 2.

When the image 2 is displayed in the main display area 32 of the window 31, the image display program 22 judges whether the image display button 45 is selected by the user (Step 204). In a case where the image display button 45 is selected by the user (YES of Step 204), the image display program 22 sets the image 2 displayed in the window 31 in a non-display state (Step 205). Accordingly, the web page 1 is redisplayed in the main display area 32 of the window 31 (see FIG. 7A).

It should be noted that when two or more images 2 are associated with one web page 1B as in the case of the node 3B of the web page 1B shown in FIG. 5, those images 2 may be switched to be displayed each time the image display button 45 is selected.

Next, an example in which the image 2 is displayed in the window 31 will be specifically described with reference to FIG. 7.

For example, it is assumed that when a user is using a shopping service over the Internet while changing the web page 1 to a different web page 1, the user misses important information that is displayed on a screen, such as a purchase list or a payment number of the shopping, without taking a note thereof. It should be noted that in this embodiment, even when information or the like that has to be checked later is displayed in the web page 1 before the change, the image 2 is automatically stored as the image 2 in the storage unit 18 as described above.

The following case is assumed. The user finds later that the information is necessary and operates the back button 41 on the operation panel 33 to display the web page 1 on which the important information is displayed, but HTML data of the web page 1 is not present in the cache area of the web browser 21. So, the web browser 21 requests the web server 50 to transmit the web page 1, but an error content is returned from the web server 50. In this case, as shown in FIG. 7A, an error message is displayed in the main display area 32 of the window 31.

In this case, the user operates a pointing device such as a mouse to put a pointer on the image display button 45 and click the left button of the mouse, to thereby select the image display button 45 (YES of Step 201, YES of Step 202).

Then, as shown in FIG. 7B, the image 2 of the web page 1, on which the important information is displayed, is displayed (Step 203).

Accordingly, the user can browse again the web page 1 that the user has missed, and can confirm the important information displayed in the web page 1 afterward.

Further, in this embodiment, the image 2 displayed on the display unit 17 is an image 2 of the entire web page 1, and the user can browse again the entire web page 1 that has been missed, by operating the scrollbars 34. Accordingly, a situation in which a point at which the missed information is displayed is hidden and the information is difficult to be confirmed afterward can be prevented.

It should be noted that when the user selects the image display button 45 again (Step 204) after confirming the important information, the web page 1 can be displayed in the main display area 32 of the window 31 (Step 205) (see FIG. 7A).

Incidentally, in a case where a CGI (Common gateway Interface) is used in the web server 50, even when the web browser 21 requests the web server 50 to transmit a web page 1 with the same URL, there is a case where the web server 50 transmits HTML data of different information. In such a case, the HTML data of an older web page 1 is overwritten by HTML data of a new web page 1. Accordingly, even when the user wishes to confirm the information of the older web page 1, the user is merely allowed to browse the new web page 1.

Here, as to the association with the image 2 and the web page 1 (see FIG. 5), assuming that the image 2 and the web page 1 are associated with each other by a URL, the image 2 and the web page 1 have one-to-one relationship, which means that only one image 2 has to be associated with one web page 1. In this case, the image display program 22 can display only the image 2 corresponding to the new web page 1, for example.

Then, even when the user wishes to confirm the information of the older web page 1, the user is eventually allowed to browse only the new web page 1 (image 2).

In this regard, in this embodiment, the association of the image 2 and the web page 1 is not managed by the URL, and is managed using the list of change history of the web pages 1. Accordingly, a plurality of images 2 can be associated with one web page 1. As a result, the user can browse the information of the older web page 1 by the image 2 and confirm the important information displayed on the web page 1 afterward.

Second Embodiment

Next, a second embodiment of the present invention will be described.

In the second embodiment, a timing at which the image display button 45 is displayed is different from that of the first embodiment. Therefore, that point will be mainly described. It should be noted that in the following description, portions having the same structures and functions as those of the first embodiment described above will be denoted by the same reference symbols and description thereof will be omitted or simplified.

FIG. 8 are diagrams for explaining a timing at which a PC 10 (terminal apparatus 10) according to the second embodiment displays the image display button 45.

Figure 8A:
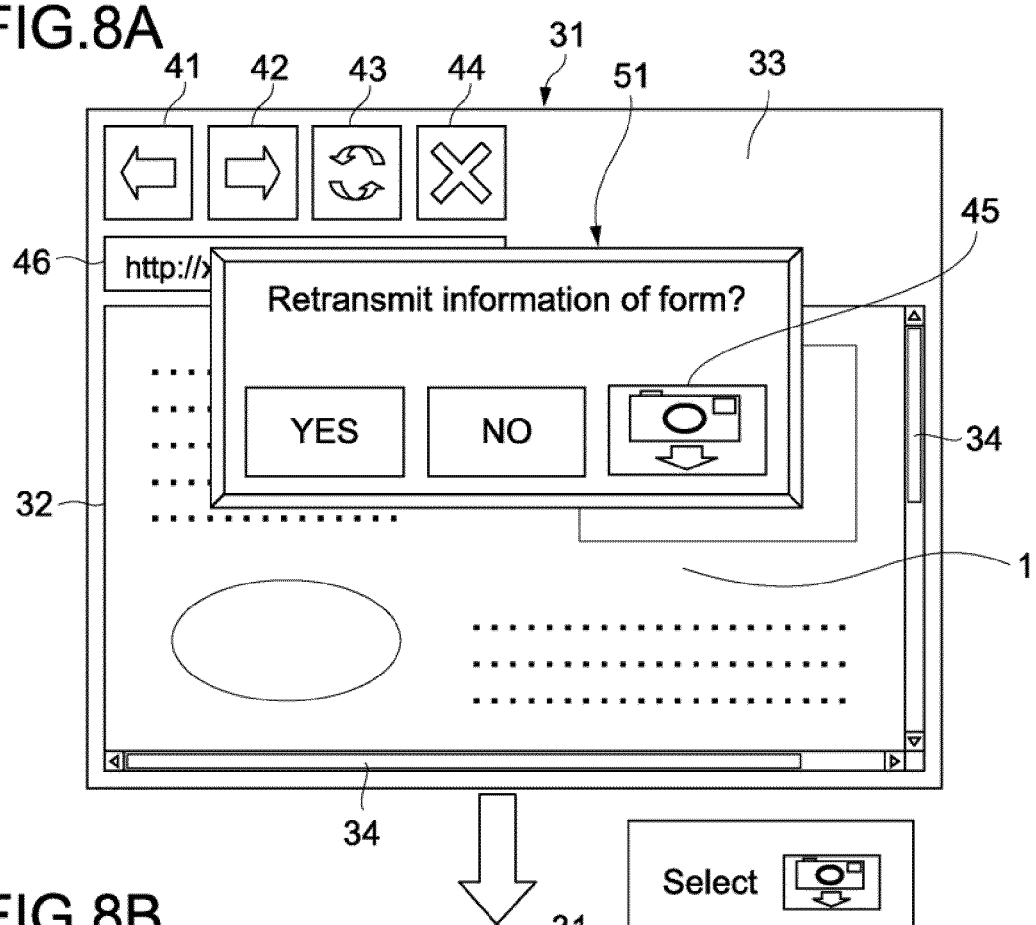
FIG. 8 are diagrams for explaining a timing at which a PC (terminal apparatus) according to another embodiment of the present invention displays an image display button.

As shown in FIG. 8A, in the second embodiment, the image display button 45 is displayed on a confirmation screen used for confirming whether form information (information for redisplaying the web page 1 displayed in the past) is transmitted to the web server 50 or not (hereinafter, referred to as dialog 51).

In other words, in the second embodiment, the image display button 45 is not displayed on the operation panel 33 of the window 31, and is displayed on the dialog 51 at a timing at which the dialog 51 is displayed.

For example, a user operates a pointing device such as a mouse to put a pointer on the image display button 45 and click the left button of the mouse, to thereby select the image display button 45.

Figure 8B:
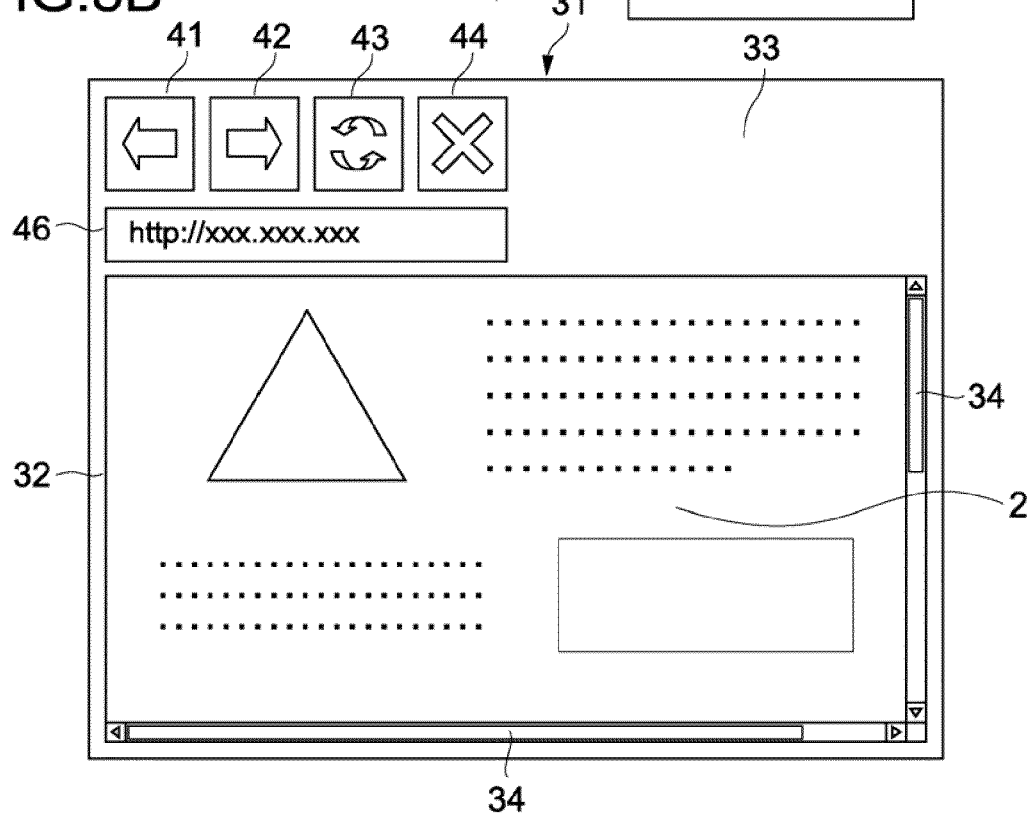

After that, an image 2 corresponding to the web page 1 that is not redisplayed unless the form information is transmitted is displayed in the main display area 32 of the window 31 (see FIG. 8B).

As the processing of the image display program 22 (processing of CPU 11), first, the image display program 22 displays the image display button 45 on the dialog 51 at a timing at which the dialog 51 is displayed. Then, the image display program 22 judges whether the image display button 45 is selected.

In a case where the image display button 45 is selected, the image display program 22 only has to read an image 2 corresponding to the web page 1 that is not redisplayed unless the form information is transmitted, from the storage unit 18, and display the image 2 in the main display area 32 of the window 31.

It should be noted that the processing of generating the image 2 by the image display program 22, storing the image 2 by associating the image 2 with the list of change history, and the like are the same as those of the first embodiment described above (see FIGS. 4 and 5).

Here, in a case where the form information has to be retransmitted to the web server 50, the processing unintended by the user may be executed in many cases. For example, it is assumed that when the user uses a shopping service or the like over the Internet, the user inputs the number of products to be purchased by the user in the input column of the web page 1, as the form information.

Then, in the case where the number of products to be purchased by the user is retransmitted as the form information to the web server 50 when the web page 1 is referred back to, there may be a case where the products are purchased twice at worst. In this way, when the form information is retransmitted to the web server 50, the processing unintended by the user may be executed in many cases.

In this regard, in the second embodiment, as described above, the image display button 45 is displayed on the dialog 51 at a timing at which the dialog 51 is displayed.

Accordingly, the processing unintended by the user (for example, processing of purchasing products twice) can be prevented from being executed.

In the description of the second embodiment, the image display button 45 is not displayed on the operation panel 33 of the window 31. However, the image display button 45 may be displayed on the operation panel 33 of the window 31. In this case, the image display program 22 only has to execute both the processing described in the first embodiment and the processing described in the second embodiment.

Third Embodiment

Next, a third embodiment of the present invention will be described.

The third embodiment is different from the embodiments described above in that a user can change an image 2. Therefore, that point will be mainly described. It should be noted that in the description of the third embodiment, points different from those of the first embodiment will be mainly described.

Figure 9:
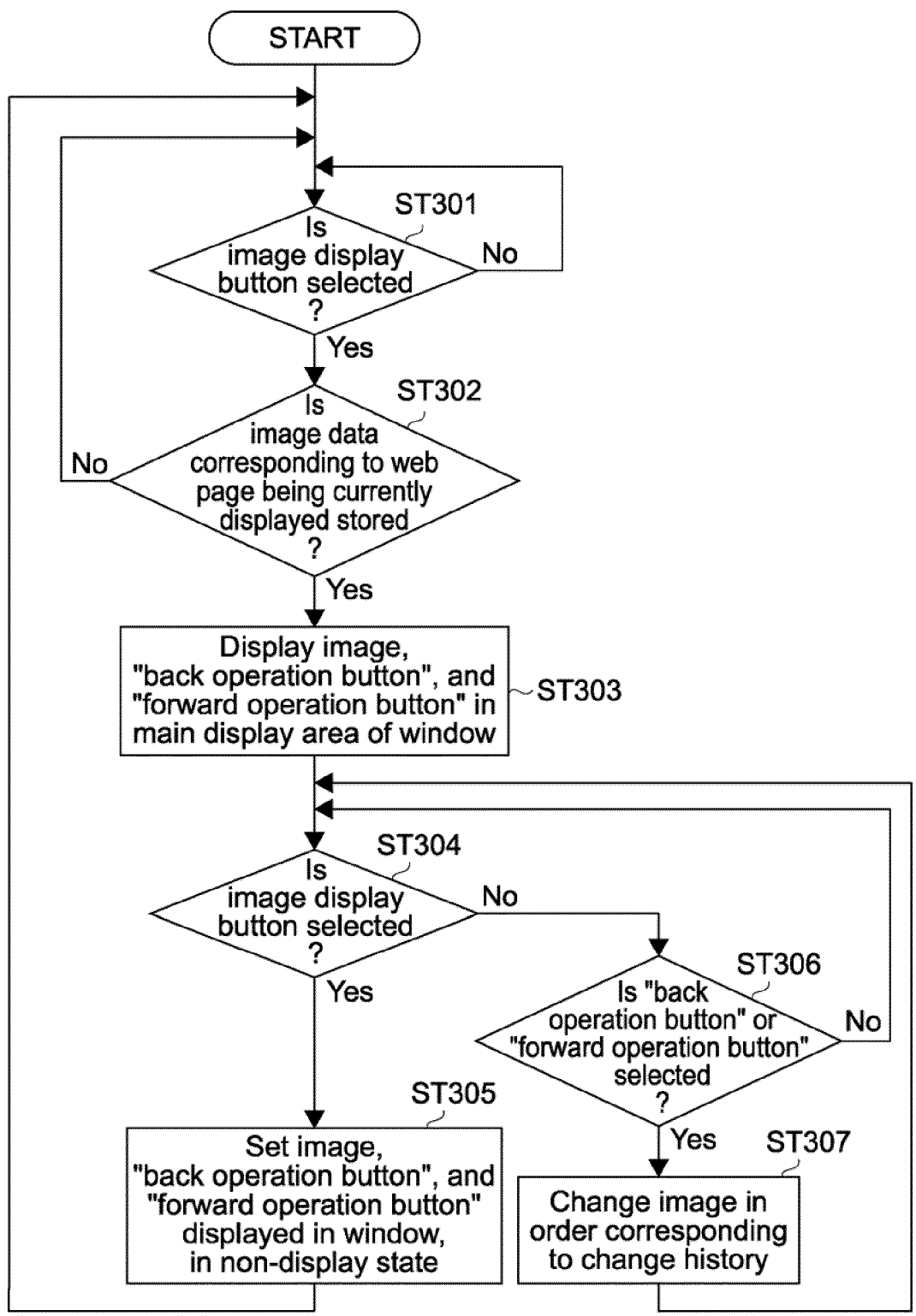
FIG. 9 is a flowchart showing an operation at a time when an image display program according to still another embodiment of the present invention displays an image of a web page.

FIG. 9 is a flowchart showing an operation at a time when an image display program 22 (CPU 11) according to the third embodiment displays an image 2 of a web page 1.

Figure 10:
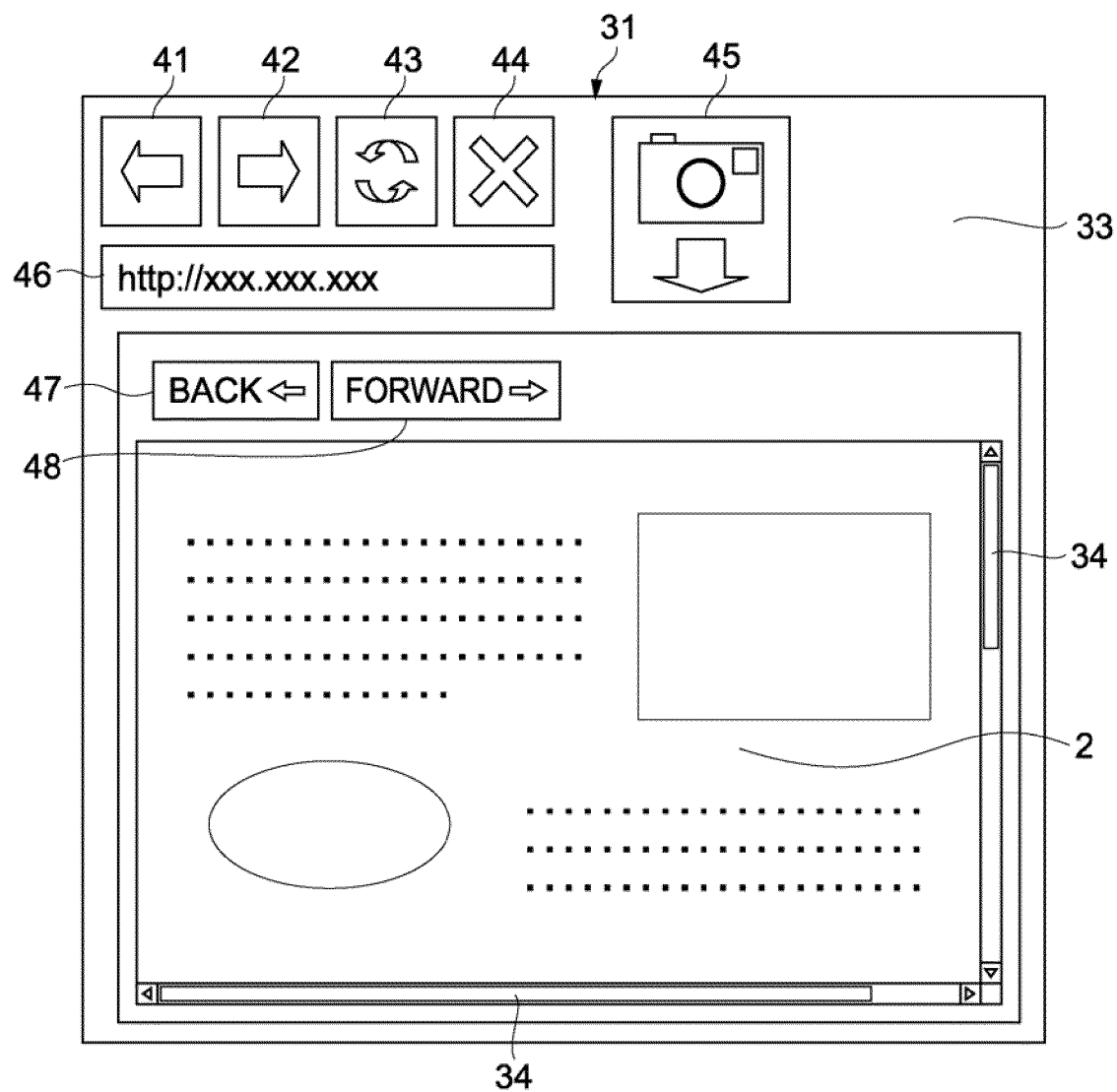
FIG. 10 is a diagram showing a state where an image of a web page, a back operation button, and a forward operation button are displayed in a main display area of a window.

FIG. 10 is a diagram showing a state where the image 2 of the web page 1, a back operation button 47, and a forward operation button 48 are displayed in the main display area 32 of the window 31.

It should be noted that the processing of generating the image 2 by the image display program 22, storing the image 2 by associating the image 2 with the list of change history, and the like are the same as those of the first embodiment described above (see FIGS. 4 and 5).

The image display program 22 judges whether the image display button 45 displayed on the operation panel 33 of the window 31 is selected by the user (Step 301).

When the image display button 45 is selected by the user (YES of Step 301), the image display program 22 judges whether an image 2 corresponding to the web page 1 being currently displayed is stored in the storage unit 18 (Step 302).

In a case where an image 2 corresponding to the web page 1 being currently displayed is stored (YES of Step 302), the image 2 is read from the storage unit 18. Then, the image 2 read from the storage unit 18, the back operation button 47, and the forward operation button 48 are displayed in the main display area 32 of the window 31 (Step 303) (see FIG. 10). It should be noted that the back operation button 47 and the forward operation button 48 are displayed above the image 2 of the web page 1, for example.

Next, the image display program 22 judges whether the image display button 45 is selected by the user (Step 304). In a case where the image display button 45 is selected by the user (YES of Step 304), the image display program 22 sets the image 2, the back operation button 47, and the forward operation button 48, which are displayed in the window 31, in a non-display state (Step 305). Accordingly, the web page 1 is redisplayed in the main display area 32 of the window 31.

In a case where the image display button 45 is not selected in Step 304 (NO of Step 304), the image display program 22 judges whether the back operation button 47 or the forward operation button 48 is selected (Step 306).

In a case where the back operation button 47 or the forward operation button 48 is not selected (NO of Step 306), the image display program 22 returns to Step 304.

On the other hand, in a case where the back operation button 47 or the forward operation button 48 is selected (YES of Step 306), the image 2 of the web page 1 is displayed while being changed in the order corresponding to the change history of the web page 1. In this case, as described above, since the image display program 22 associates the image 2 of the web page 1 with the list of change history of the web pages 1 and stores the image 2 in the storage unit 18 (see FIG. 5), based on the data, the image 2 of the web page 1 may be changed to be displayed.

When the image 2 of the web page 1 is changed, the image display program 22 returns to Step 304 again.

By such processing, the user can display the image 2 while being changed.

In a case where an error page is displayed in the window 31, even when the user selects the back button 41 or the forward button 42 displayed on the operation panel 33 of the window 31, the page may not be changed to the previous pages or subsequent pages in many cases.

Therefore, for example, unless the web page 1 in which an error page has been displayed is changed to the previous pages or subsequent pages, the web page 1 displaying the important information the user wishes to confirm may be difficult to be reached in some cases.

In such a case, the user operates the back operation button 47 or the forward operation button 48 to change the image 2 of the web page 1, and accordingly an image 2 corresponding to a target web page 1 can be displayed.

As described above, in the third embodiment, the image 2 can be displayed while being changed, with the result that an image 2 corresponding to a target web page 1 can be displayed and important information can be confirmed even when an error page is displayed and the page is not returned to the previous pages.

In the third embodiment, the difference with the first embodiment described above has been mainly descried, but the third embodiment is of course applicable to the second embodiment described above. In this case, when the image display button 45 displayed on the dialog 51 is selected, the image display program 22 only has to display the image 2 of the web page 1, the back operation button 47, and the forward operation button 48 in the main display area 32 of the window 31. Then, when the back operation button 47 or the forward operation button 48 is operated, the image display program 22 only has to display the image 2 of the web page 1 while being changed in the window 31.

Fourth Embodiment

Next, a fourth embodiment of the present invention will be described.

The fourth embodiment is different from the embodiments described above in that a history image is displayed in the main display area 32 of the window 31. The history image shows a state where reduced-size images of images 2 of the web pages 1 are arranged in the order corresponding to the change history. Therefore, that point will be mainly described. It should be noted that in the description of the fourth embodiment, points different from those of the first embodiment will be mainly described.

FIG. 11 are diagrams showing an example in which a state where a web page 1 is displayed on the display unit 17 and a state where a history image 4 is displayed thereon are switched.

As shown in FIG. 11, on the operation panel 33 of the window 31, a history display button 49 is arranged next to the image display button 45.

When the user selects the history display button 49, switched are the state where a web page 1 is displayed on the display unit 17, and the state where a history image 4 showing the reduced-size images 5 of the images 2 of the web pages 1, which are arranged in the order corresponding to the change history.

In this case, the image display program 22 judges whether the history display button 49 is selected, and in a case where the history display button 49 is selected, the image display program 22 may execute the processing of switching between the display states.

The history image 4 is generated by the list of change history described above, and the image 2 of the web page 1 that is associated with the list of change history.

The reduced-size image 5 in the history image 4 may be an image obtained by simply reducing the size of the image 2. Alternatively, the reduced-size image 5 may be an image generated by extracting feature information from the image 2, the HTML data of the original web page 1, or the like, and reflecting the feature information.

The image display program 22 judges whether a reduced-size image 5 is selected, and in a case where a reduced-size image 5 is selected, an image 2 corresponding to the reduced-size image 5 is displayed in the main display area 32 of the window 31.

In the fourth embodiment, since the history image 4 is displayed, the user can search out an image 2 of a target web page 1 speedily.

In the description of the fourth embodiment, the history display button 49 is arranged on the operation panel 33 of the window 31, in addition to the image display button 45. However, the history display button 49 is not necessarily needed. For example, the image display button 45 may be given a function as the image display button 45 and a function as the history display button 49.

For example, the image display program 22 may execute the processing of displaying the image 2 in the window 31 when the image display button 45 is clicked, and the processing of displaying the history image 4 when the image display button 45 is double-clicked. Alternatively, the image display program 22 may execute the processing of switching between the images in the order of the image 2 of the web page 1, the history image 4, and the web page 1, each time image display button 45 is selected.

In the fourth embodiment, the difference with the first embodiment described above has been mainly described, but the fourth embodiment is of course applicable to the second embodiment and the third embodiment described above.

MODIFIED EXAMPLES

In the embodiments described above, the image 2 of the web page 1 (or image 2 of web page 1, back operation button 47 and forward operation button 48, or history image 4) has been described to be displayed in the main display area 32 of the window 31.

However, it may be possible to prepare a dedicated window separately from the window 31 by the web browser 21, and display the image 2 of the web page 1 in the dedicated window.

For example, in a case where the image 2 of the web page 1 can be changed as described in the third embodiment, the user may be confused without knowing which of the web page 1 and the image 2 the user changes. Therefore, in an embodiment in which the web page 1 can be changed, it is particularly effective to display the image 2 of the web page 1 in the dedicated window as described above.

In the description above, the case where when the total data size of the image 2 exceeds the maximum storage capacity of the storage unit 18, the older data is deleted sequentially has been described. However, a method of preventing the storage unit 18 to be compressed is not limited thereto. For example, when the web browser 21 is terminated, the processing of deleting the image 2 may be executed. Alternatively, when a predetermined period of time (for example, one week, one month, or the like) has passed since the storing of the image 2, the processing of deleting the image 2 may be executed.

Alternatively, in accordance with the importance of the image 2, the processing of changing a period of time after which the image 2 is deleted may be executed. For example, assuming that the user selects the image display button 45 to display the image 2 of the web page 1 in which important information is included, there may be a case where the image 2 of the web page 1 is desired to be preserved for a long period of time. In this regard, for example, the processing of displaying an input column in which the importance of the image 2 of the web page 1 can be input by the user (for example, check box) on the operation panel 33 of the window 31 is executed. The user only has to input the importance in the input column. The image display program 22 changes a period of time after which the image 2 is deleted, in accordance with the input importance.

In the embodiments described above, the PC 10 has been described as an example of the terminal apparatus 10. However, the terminal apparatus 10 is not limited to the PC 10. Typically, any apparatus may be used as the terminal apparatus 10 as long as the apparatus includes the communication unit 19, and can communicate with a web server 50 by the communication unit 19 via the network 60. Other examples of the terminal apparatus 10 include cellular phones, game devices, portable game devices, and television apparatuses.

In the embodiments described above, the storage unit 18 of the terminal apparatus 10 stores the image 2 of the web page 1. However, a location at which the image 2 is stored may be a server over the Internet. In this case, the image 2 generated by the terminal apparatus 10 is transmitted to the server via the communication unit 19. Upon receiving the image 2, the server stores the image 2 in the storage unit 18. It should be noted that the image 2 is stored in the storage unit 18 of the server while being associated with the history list.

The terminal apparatus 10 requests the server to acquire the image 2 when an image 2 is necessary to be displayed. Upon receiving the request of acquisition from the terminal apparatus 10, the server transmits the image 2 to the terminal apparatus 10. The terminal apparatus 10 only has to receive the image 2 transmitted from the server and display the image 2 on the display unit 17.

In a case where the terminal apparatus 10 is a small-size terminal apparatus 10 such as a cellular phone and a portable game device, when the image 2 is stored in the storage unit 18 of the terminal apparatus 10, the storage unit 18 may be compressed and other processing may be affected accordingly. Therefore, in the small-size terminal apparatus 10, as described above, it is particularly effective to transmit the image 2 to the server.

In the description above, each time the web page 1 is changed, the terminal apparatus 10 automatically generates an image 2 of the web page 1. However, it may be possible for a provider of a web service to embed metadata indicating that the image 2 of the web page 1 is to be stored, in HTML data of the web page 1, and it may be possible for the terminal apparatus 10 to generate the image 2 of the web page 1 in accordance with the metadata.

In this case, from the web server 50, information on a first web page 1 that includes the metadata, or information on a second web page 1 that excludes the metadata is transmitted to the terminal apparatus 10.

When receiving the information on the first web page 1 or the information on the second web page 1 that is transmitted from the web server 50, the web browser 21 displays the first web page 1 or the second web page 1 on the display unit 17.

When the first web page 1 including the metadata is displayed, the image display program 22 generates an image 2 of the first web page 1 based on the metadata. Then, after associating the list of change history of the first web page 1 and the second web page 1 with the image 2 of the first web page 1, the image display program 22 stores the image in the storage unit 18.

Then, the image display program 22 judges whether the user instructs the image 2 to be displayed, and in a case where the user instructs the image 2 to be displayed, the image display program 22 displays the image 2 of the first web page 1 on the display unit 17.

By such processing, the user can also browse a missed web page 1 again and confirm information displayed in the web page 1 afterward.

The present application contains subject matter related to that disclosed in Japanese Priority Patent Application JP 2010-073174 filed in the Japan Patent Office on Mar. 26, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A terminal apparatus, comprising:
a communication unit configured to be capable of communicating with a web server and receive information of a web page from the web server;
a storage unit; and
a controller configured to display the web page in a window displayed on a display unit, generate an image of the web page before a user input changes the web page to a different web page, associate the generated image with a change history of the web page to store the generated image in the storage unit, and read the image corresponding to the change history from the storage unit based on an instruction made by a user to display the image, to display the image on the display unit,
wherein the image is a graphical reproduction of the web page as it was previously displayed on the display unit, and
wherein the controller performs, when the web page is changed to the different web page, scroll capture on the web page before the change, to generate the image of the entire web page before the change;

wherein the controller displays the image, instead of the web page, in a main display area serving as an area of the window in which the web page is displayed.

2. The terminal apparatus according to claim 1, wherein the controller displays an input operation image in which the instruction made by the user to display the image is input, on the display unit.

3. The terminal apparatus according to claim 2, wherein the controller displays the input operation image on a confirmation screen used for confirming, with the user, whether information for redisplaying the web page displayed in the past is transmitted to the web server via the communication unit.

4. The terminal apparatus according to claim 2, wherein the controller displays the input operation image in an operation image display area of the window in which operation images for operating the web page are arranged.

5. The terminal apparatus according to claim 1, wherein the controller displays a dedicated window on the display unit separately from the window and displays the image in the dedicated window.

6. The terminal apparatus according to claim 1, wherein the controller displays the image after being changed in an order corresponding to the change history based on an instruction made by the user to change the image.

7. The terminal apparatus according to claim 1, wherein the controller generates a history image showing a state where reduced-size images of the images are arranged in an order corresponding to the change history based on the images that are associated with the change history and stored in the storage unit, and displays the history image on the display unit based on an instruction made by the user to display the history image.

8. A terminal apparatus, comprising:
a communication unit configured to be capable of communicating with a web server and receive one of information on a first web page including metadata indicating that an image of a web page displayed on a display unit is to be stored, and information on a second web page excluding the metadata, from the web server;
a storage unit; and
a controller configured to display one of the first web page and the second web page in a window displayed on the display unit based on one of the information on the first web page and the information on the second web page, generate an image of the first web page based on the metadata each time the first web page is displayed, associate the image with a change history of the first web page and the second web page to store the image in the storage unit, and read the image corresponding to the change history from the storage unit based on an instruction made by a user to display the image, to display the image on the display unit,
wherein the image is a graphical reproduction of the web page as it was previously displayed on the display unit, and
wherein the controller performs, when the web page is changed to the different web page, scroll capture on the web page before the change, to generate the image of the entire web page before the change;
wherein the controller displays the image, instead of the web page, in a main display area serving as an area of the window in which the web page is displayed.

9. A processing system, comprising:
a web server configured to transmit information of a web page; and
a terminal apparatus including
a communication unit configured to be capable of communicating with the web server and receive information of the web page from the web server,
a storage unit, and
a controller configured to display the web page in a window displayed on a display unit, generate an image of the web page before a change each time the web page is changed to a different web page, associate the generated image with a change history of the web page to store the generated image in the storage unit, and read the image corresponding to the change history from the storage unit based on an instruction made by a user, to display the image on the display unit,
wherein the image is a graphical reproduction of the web page as it was previously displayed on the display unit, and
wherein the controller performs, when the web page is changed to the different web page, scroll capture on the web page before the change, to generate the image of the entire web page before the change;
wherein the controller displays the image, instead of the web page, in a main display area serving as an area of the window in which the web page is displayed.

10. A processing system, comprising:
a web server configured to transmit one of information on a first web page including metadata indicating that an image of a web page displayed on a display unit is to be stored, and information on a second web page excluding the metadata; and
a terminal apparatus including
a communication unit configured to be capable of communicating with the web server and receive one of the information on the first web page and the information on the second web page from the web server, a storage unit, and
a controller configured to display one of the first web page and the second web page in a window displayed on the display unit based on one of the information on the first web page and the information on the second web page, generate an image of the first web page based on the metadata each time the first web page is displayed, associate the image with a change history of the first web page and the second web page to store the image in the storage unit, and read the image corresponding to the change history from the storage unit based on an instruction made by a user to display the image, to display the image on the display unit,
wherein the image is a graphical reproduction of the web page as it was previously displayed on the display unit, and
wherein the controller performs, when the web page is changed to the different web page, scroll capture on the web page before the change, to generate the image of the entire web page before the change;
wherein the controller displays the image, instead of the web page, in a main display area serving as an area of the window in which the web page is displayed.

11. A processing system, comprising:
a web server configured to transmit information of a web page;
a server including a storage unit; and
a terminal apparatus including a communication unit configured to be capable of communicating with the web server and the server and receive information of the web page from the web server, and a controller configured to display the web page in a window displayed on a display unit, generate an image of the web page before a change each time the web page is changed to a different web page, associate the generated image with a change history of the web page to transmit the generated image to the server, cause the storage unit of the server to store the generated image, and receive the image corresponding to the change history from the server based on an instruction made by a user, to display the image on the display unit, wherein the image is a graphical reproduction of the web page as it was previously displayed on the display unit, and wherein the controller performs, when the web page is changed to the different web page, scroll capture on the web page before the change, to generate the image of the entire web page before the change;

wherein the controller displays the image, instead of the web page, in a main display area serving as an area of the window in which the web page is displayed.

12. A processing method, comprising:

receiving information of a web page from a web server;

displaying the web page in a window displayed on a display unit;

generating an image of the web page before a change each time the web page is changed to a different web page;

associating the generated image with a change history of the web page to store the generated image in a storage unit; and reading the image corresponding to the change history from the storage unit based on an instruction made by a user to display the image, to display the image on the display unit, wherein the image is a graphical reproduction of the web page as it was previously displayed on the display unit, and wherein when the web page is changed to the different web page, scroll capture on the web page before the change, generating the image of the entire web page before the change;

wherein a controller displays the image, instead of the web page, in a main display area serving as an area of the window in which the web page is displayed.

13. A processing method, comprising:

receiving one of information on a first web page including metadata indicating that an image of a web page displayed on a display unit is to be stored, and information on a second web page excluding the metadata, from a web server;

displaying one of the first web page and the second web page in a window displayed on the display unit based on one of the information on the first web page and the information on the second web page;

generating an image of the first web page based on the metadata each time the first web page is displayed;

associating the image with a change history of the first web page and the second web page to store the image in a storage unit; and reading the image corresponding to the change history from the storage unit based on an instruction made by a user to display the image, to display the image on the display unit, wherein the image is a graphical reproduction of the web page as it was previously displayed on the display unit, and wherein when the web page is changed to the different web page, scroll capture on the web page before the change, generating the image of the entire web page before the change;

wherein a controller displays the image, instead of the web page, in a main display area serving as an area of the window in which the web page is displayed.

14. A non-transitory computer-readable medium having embodied thereon a program, which when executed by a terminal apparatus, causes the terminal apparatus to perform a method, the method comprising:

receiving information of a web page from a web server;

displaying the web page in a window displayed on a display unit;

generating an image of the web page before a change each time the web page is changed to a different web page;

associating the generated image with a change history of the web page to store the generated image in a storage unit; and reading the image corresponding to the change history from the storage unit based on an instruction made by a user to display the image, to display the image on the display unit, wherein the image is a graphical reproduction of the web page as it was previously displayed on the display unit, and wherein when the web page is changed to the different web page, scroll capture on the web page before the change, generating the image of the entire web page before the change;

wherein a controller displays the image, instead of the web page, in a main display area serving as an area of the window in which the web page is displayed.

15. A non-transitory computer-readable medium having embodied thereon a program, which when executed by a terminal apparatus, causes the terminal apparatus to perform a method, the method comprising:

receiving one of information on a first web page including metadata indicating that an image of a web page displayed on a display unit is to be stored, and information on a second web page excluding the metadata, from a web server;

displaying one of the first web page and the second web page in a window displayed on the display unit based on one of the information on the first web page and the information on the second web page;

generating an image of the first web page based on the metadata each time the first web page is displayed;

associating the image with a change history of the first web page and the second web page to store the image in a storage unit; and reading the image corresponding to the change history from the storage unit based on an instruction made by a user to display the image, to display the image on the display unit, wherein the image is a graphical reproduction of the web page as it was previously displayed on the display unit, and wherein when the web page is changed to the different web page, scroll capture on the web page before the change, generating the image of the entire web page before the change;

wherein a controller displays the image, instead of the web page, in a main display area serving as an area of the window in which the web page is displayed.

16. The terminal apparatus of claim 1, wherein the graphical reproduction is separate from a cached version of the web page.

17. The terminal apparatus of claim 1, wherein the graphical reproduction is substantially a static image substantially without meta data associated internet content associated with the web page.

18. The terminal apparatus of claim 17, wherein the graphical reproduction is a static image without meta data associated internet content associated with the web page.

* * * * *